United States Patent [19]
Lentz

[11] 3,933,650
[45] Jan. 20, 1976

[54] APPARATUS FOR FILTERING FLUIDS

[76] Inventor: Morgan Lentz, 60 Addison Ave., Rutherford, N.J. 07070

[22] Filed: Jan. 13, 1975

[21] Appl. No.: 540,490

Related U.S. Application Data

[63] Continuation of Ser. No. 379,994, July 17, 1973.

[52] U.S. Cl. .................... 210/387; 55/354; 210/77; 210/90; 210/142; 210/236; 210/398; 210/405
[51] Int. Cl.² ........................................ B01D 33/00
[58] Field of Search .......... 55/283, 354; 210/77, 90, 210/106, 111, 137, 142, 232, 236, 387, 393, 210/398, 399, 405

[56] References Cited
UNITED STATES PATENTS

| | | | |
|---|---|---|---|
| 2,348,925 | 5/1944 | Reichhelm | 210/236 |
| 3,333,693 | 8/1967 | Hirs | 210/387 X |
| 3,399,778 | 9/1968 | O'Neill | 210/387 |
| 3,478,879 | 11/1969 | Hirs | 210/77 |
| 3,647,083 | 3/1972 | Niccum et al. | 210/236 |

Primary Examiner—Charles N. Hart
Assistant Examiner—Robert G. Mukai
Attorney, Agent, or Firm—Sommers & Sommers

[57] ABSTRACT

An apparatus for filtering fluids to remove solid discard particles therefrom, in which the apparatus includes a housing having a filter chamber, an inlet-side sealing chamber, and a discharge-side sealing chamber, a movable fluid inlet member which is movable into and out of the housing and which includes inlet-side and discharge-side bearing surfaces, and flexible sealing members which cooperate with the bearing surfaces in the sealing chambers to seal the filter chamber, a movable length of filter medium, and means for displacing the bearing surfaces and the movable length of filter medium, and which is operated by displacing the discharge-side movable bearing surface so that the movable length of filter medium may pass clear thereof, and displacing the movable length of filter medium clear of the discharge-side movable bearing surface to provide synchronized removal of the used length of filter medium from the filter chamber with discard particles associated therewith which are embedded therein and collected thereby, and indexing of a new length of filter medium in the filter chamber, without interference from or with the discharge-side flexible sealing member and bearing surface, which enables high volume filtration operations, over a wide range of fluid inlet pressures, for long periods of time, to enable filtration of discard particles in a wide range of shapes and sizes. In the apparatus, the flexible sealing members conform to the shape of the bearing surfaces to provide efficient non-bypass sealing of the filter chamber, and reciprocating filter medium gripping elements provide efficient displacement of the continuous length of filter medium.

7 Claims, 6 Drawing Figures

APPARATUS FOR FILTERING FLUIDS

This is a continuation of application Ser. No. 379,994, filed July 17, 1973.

BACKGROUND OF THE INVENTION

This invention relates generally to filtering devices, and more particularly relates to an apparatus for filtering fluid including displacement of a used length of filter medium, and indexing of a new length of filter medium.

In a typical filtration operation, fluid passes through a filter medium, which is located in a filter chamber, in order to strain solid discard particles therefrom. Such filter medium may be sealed in the filter chamber at the ends thereof, in order to prevent fluid bypass for single pass filtration.

In large volume filtration operations, as in direct line tubular filter apparatus, for example, efficiency has been achieved by utilization of continuous lengths of tubular filter media, and means for automatically displacing the tubular filter medium through the filter chamber so as to automatically remove the used length of filter medium and index a new length of filter medium. Furthermore, non-bypass sealing has been provided in such devices by incorporation of seals comprising movable and fixed bearing surfaces which cooperate at the filter medium inlet and discharge sides of the filter chamber.

In displacing the used length of filter medium from the filter chamber through a clearance space between the discharge side movable and fixed bearing surfaces, accumulations of collected discard particles, which become associated with discard particles embedded in the interstices of the filter medium during filtration, interfered with such displacement and adhered to the disharge-side bearing surface with interfered with sealing of the filter chamber. To prevent accumulation of collected discard particles, operational requirements for such apparatus included high fluid inlet pressures, shortened time periods of operation, and limitation of particle sizes filtered to small sized discard particles, thereby substantially reducing the efficiency of operation and the utility and applicability of such apparatus.

In sealing the filter medium in the filter chamber, such seals incorporated large sealing surfaces which required high sealing pressures to operate, limited the internal fluid pressures which the enclosure was capable of withstanding, and were susceptible to seal leaks with resultant fluid bypass.

To remove the used length of filter medium and index a new length of filter medium, filter medium pinching rollers were utilized at the discharge-side end of the filter medium. Discard particles associated with the used length of filter medium being extracted, and solutions used during the filtration cycle, adhered to the rollers, with resultant damage to the roller surfaces and interference with the indexing cycle.

SUMMARY OF THE INVENTION

In accordance with the foregoing, it may be regarded as an object of the present invention to provide a fluid filtering apparatus which enables displacement of the used length of filter medium, including discard particles associated therewith which are embedded therein and collected thereby, without interference from or with the discharge-side seal.

It is a further object of the present invention to provide a fluid filtering apparatus which enables efficient sealing of the filter medium in the filter chamber during filtration, and which provides seals capable of withstanding high internal fluid pressures. It is still further object of the present invention to provide a fluid filtering apparatus which enables displacement of the used length of filter medium without interfering with the displacing means.

In accordance with the present invention, the foregoing objects and others are achieved through use of an apparatus which includes a discharge-side movable bearing surface, a movable length of filter medium, and means for displacing the discharge-side movable bearing surface and the continuous length of filter medium, and which is operated by displacing the discharge-side movable bearing surface, so that the movable length of filter medium may pass clear thereof, and displacing the movable length of filter medium clear of the discharge-side movable bearing surface, which provides synchronized removal of the used length of filter medium from the filter chamber with discard particles associated therewith which are embedded therein and collected thereby and indexing of a new length of filter medium in the filter chamber without interference from or with the discharge-side seal, which enables high volume filtration operations, over a wide range of fluid inlet pressures, for long periods of time, to enable filtration of discard particles in a wide range of shapes and sizes. In the apparatus, means for sealing the filter medium in the filter chamber, which include a bearing surface and a flexible sealing member which conforms to the shape of the bearing surface, provide efficient sealing, and guide wheels, including reciprocating filter medium gripping elements, provide efficient filter medium displacement, while preventing adherence of interfering substances to the surfaces thereof.

DESCRIPTION OF THE DRAWINGS

The invention is diagrammatically illustrated, by way of example, in the appended drawings, in which.

DESCRIPTION OF THE PREFERRED EMBODIMENT

Figure 1:
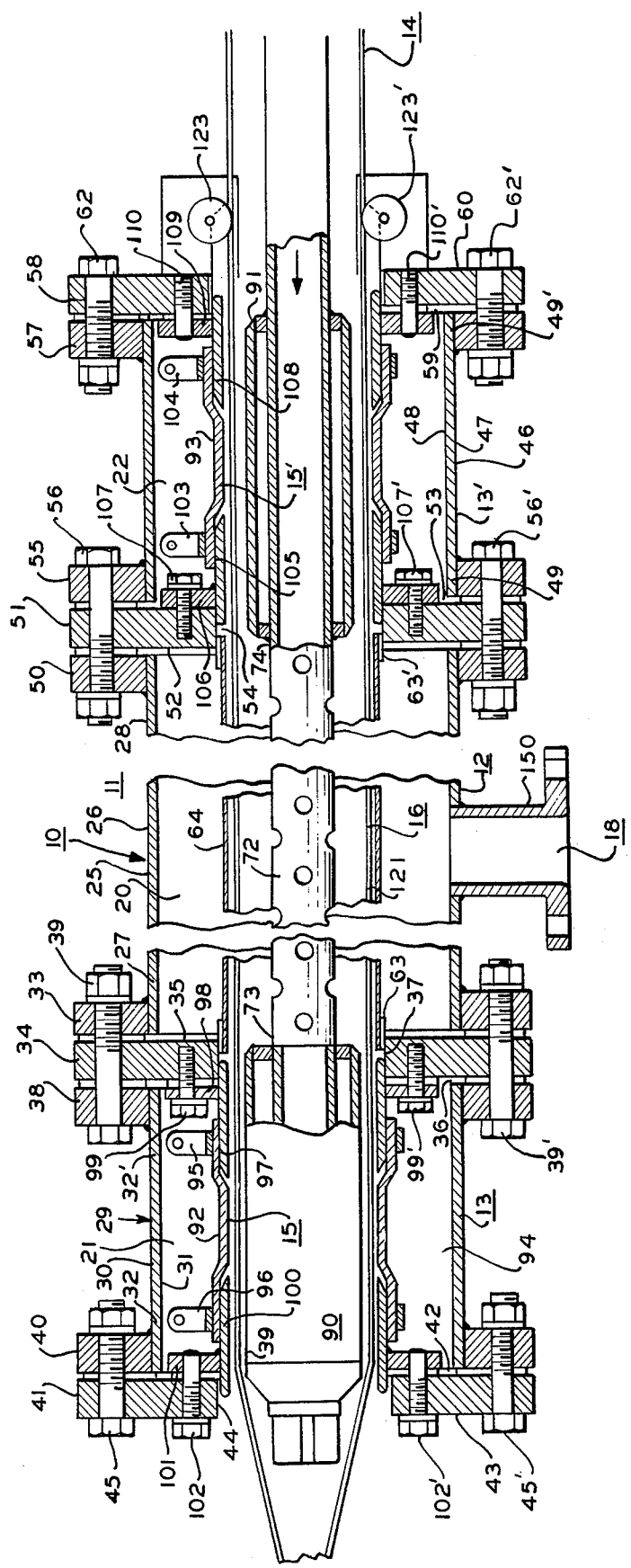
FIG. 1 is a side elevational, partly-sectional, partly-fragmentary view of a portion of the fluid filtering apparatus as shown in FIG. 2, in accordance with the invention.

The fluid filtering apparatus 10, as illustrated in the Figures, may comprise, for example, a housing 11 having a filter chamber 12 and sealing chambers 13, 13', a movable fluid inlet member 14 which is movable into and out of the housing 11, means 15 for sealing the filter chamber 12 which are located in the sealing chambers 13, 13', a movable length of filter medium 16 which is extendable through the housing 11, means 17 for displacing the movable length of filter medium 16 and the movable fluid inlet member 14, and a filtrate outlet 18 which is connected to the housing 11.

Figure 2:
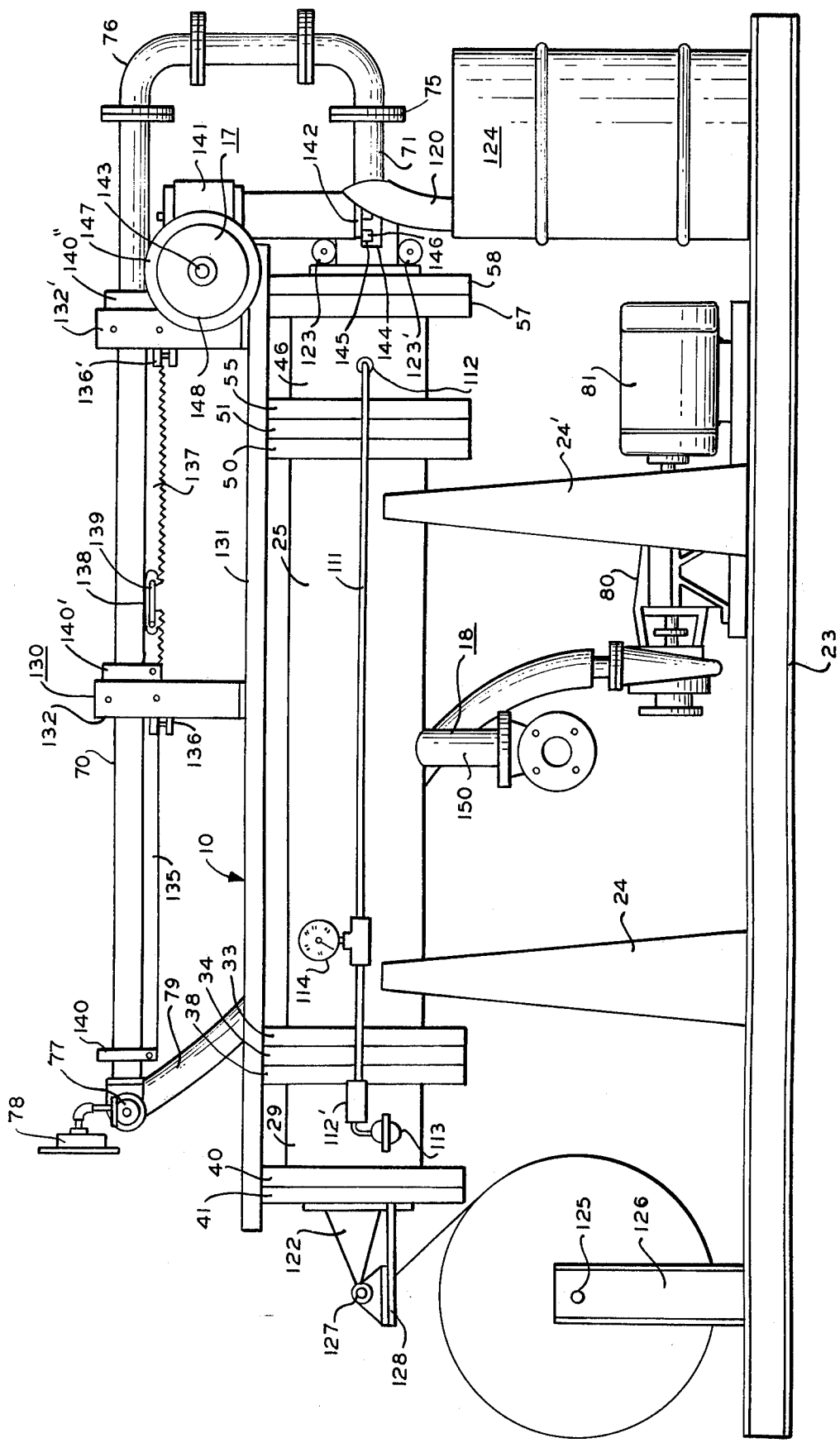
FIG. 2 is a side elevational view of the fluid filtering apparatus in the filtering cycle.

The housing 11, as shown in FIGS. 1 and 2, for example, includes a central portion 20, an inlet side 21 which is connected to the central portion 20 at one end thereof, and through which a new length of filter medium is indexed, and a discharge side 22 which is connected to the central portion 20 at the other end thereof, and through which the used length of filter medium is displaced. The housing 11 is mounted to a base 23 by supports 24, 24'. In the housing central portion 20, a tubular central frame segment 25 having an outside surface 26 includes an inlet-side end portion 27 and a discharge-side end portion 28. In the housing inlet side 21, a tubular inlet-side frame segment 29 having an outside surface 30 and an inside surface 31, includes end portions 32, 32'. An inlet-side inner flange 33 is mounted to the outside surface 26 of the tubular central frame segment inlet-side end portion 27. An inlet-side annular plate 34, which is located adjacent to the inlet-side inner flange 33, includes a first side wall 35, a second side wall 36, and a transverse aperture wall 37. An inlet-side intermediate flange 38 is mounted to the outside surface 30 of the tubular inlet-side frame segment 29 at end portion 32' adjacent the inlet-side annular plate second side wall 36. Bolt connectors 39, 39' interconnect the inlet-side inner flange 33, the inlet-side annular plate 34, and the inlet-side intermediate flange 38. An inlet-side outer flange 40 is mounted to the outside surface 30 of the tubular inlet-side frame segment 29 at end portion 32. An inlet-side end ring 41, which is located adjacent to the inlet-side outer flange 40, includes a first side wall 42, a second side wall 43, and a transverse aperture wall 44. Bolt fasteners 45, 45' interconnect the inlet-side outer flange 40 and the inlet-side end ring 41. In the housing discharge side 22, a tubular discharge-side frame segment 46 having an outside surface 47 and an inside surface 48, includes end portions 49, 49'. A discharge-side inner flange 50 is mounted to the outside surface 26 of the tubular central frame segment discharge-side end portion 28. A discharge-side annular plate 51, which is located adjacent to the discharge-side inner flange 50, includes a first side wall 52, a second side wall 53, and a transverse aperture wall 54. A discharge-side intermediate flange 55 is mounted to the outside surface 47 of the tubular discharge-side frame segment 46 at end portion 49 adjacent the discharge-side annular plate second side wall 53. Bolt connectors 56, 56' interconnect the discharge-side inner flange 50, the discharge-side annular plate 51, and the discharge-side intermediate flange 55. A discharge-side outer flange 57 is mounted to the outside surface 47 of the tubular discharge-side frame segment 46 at end portion 49'. A discharge-side end ring 58, which is located adjacent to the discharge-side outer flange 57, includes a first side wall 59, a second side wall 60, and a transverse aperture wall 61. Bolt fasteners 62, 62' interconnect the discharge-side outer flange 57 and the discharge-side end ring 58. Platen end rings 63, 63' are mounted to the inlet-side annular plate transverse aperture wall 37 and the discharge-side annular plate transverse aperture wall 54, and a tubular platen 64 is mounted in the filter chamber 12 to the platen end rings 63, 63'. The filter chamber 12, as shown in FIG. 1, for example, is defined by the tubular central frame segment 25, the first side wall 35 of the inlet-side annular plate 34, and the first side wall 52 of the discharge-side annular plate 51. The sealing chambers, as illustrated for example in FIG. 1, comprise an inlet-side sealing chamber 13, and a discharge-side sealing chamber 13', which are connected to the filter chamber 12. The inlet-side sealing chamber 13 is defined by the tubular inlet-side frame segment 29, the inlet-side annular plate second side wall 36, and the inlet-side end ring first side wall 42. The discharge-side sealing chamber 13' is defined by the tubular discharge-side frame segment 46, the discharge-side annular plate second side wall 53, and the discharge-side end ring first side wall 59.

Figure 3:
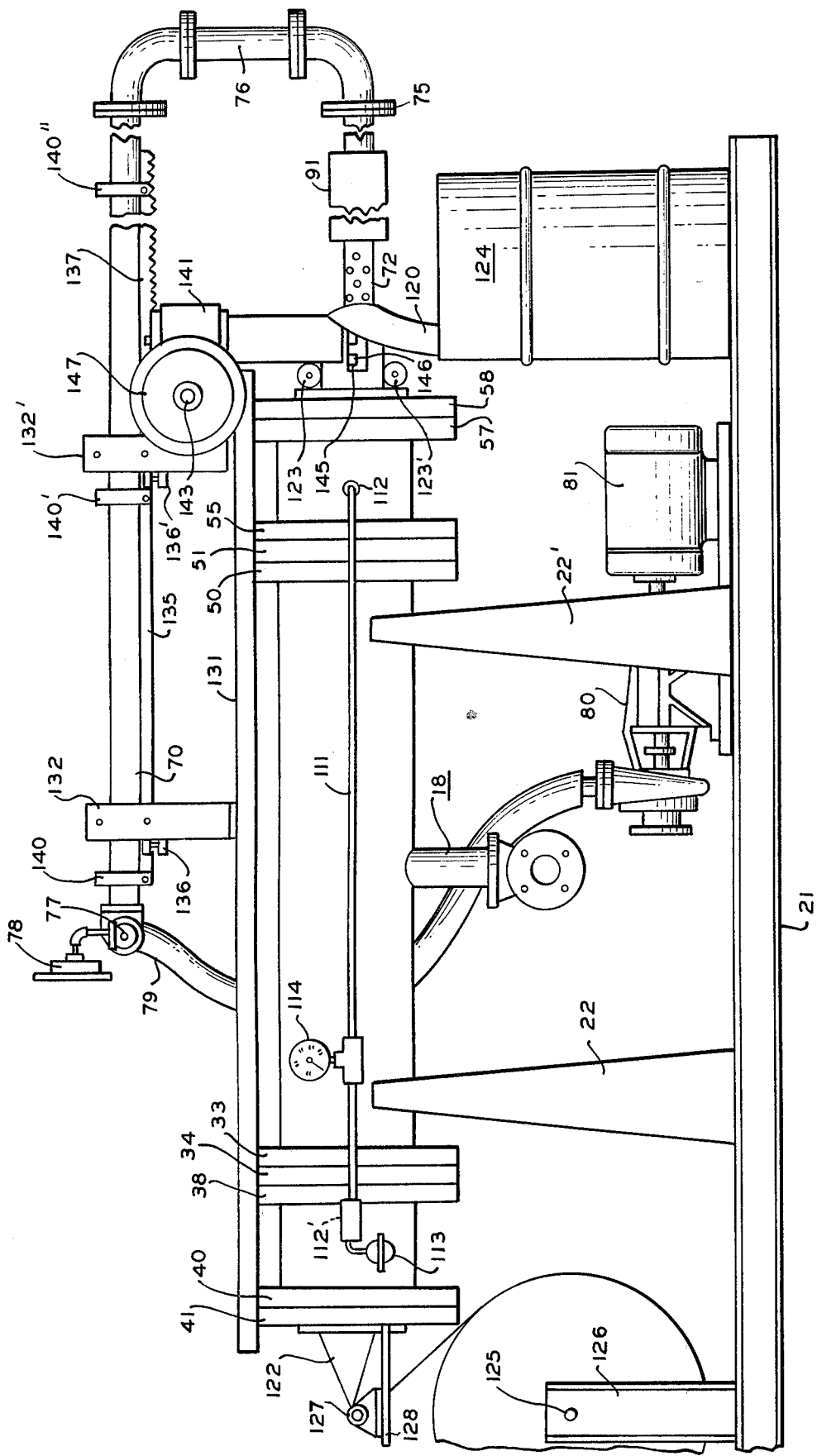
FIG. 3 is a side elevational view of the fluid filtering apparatus in the indexing cycle.
Figure 4:
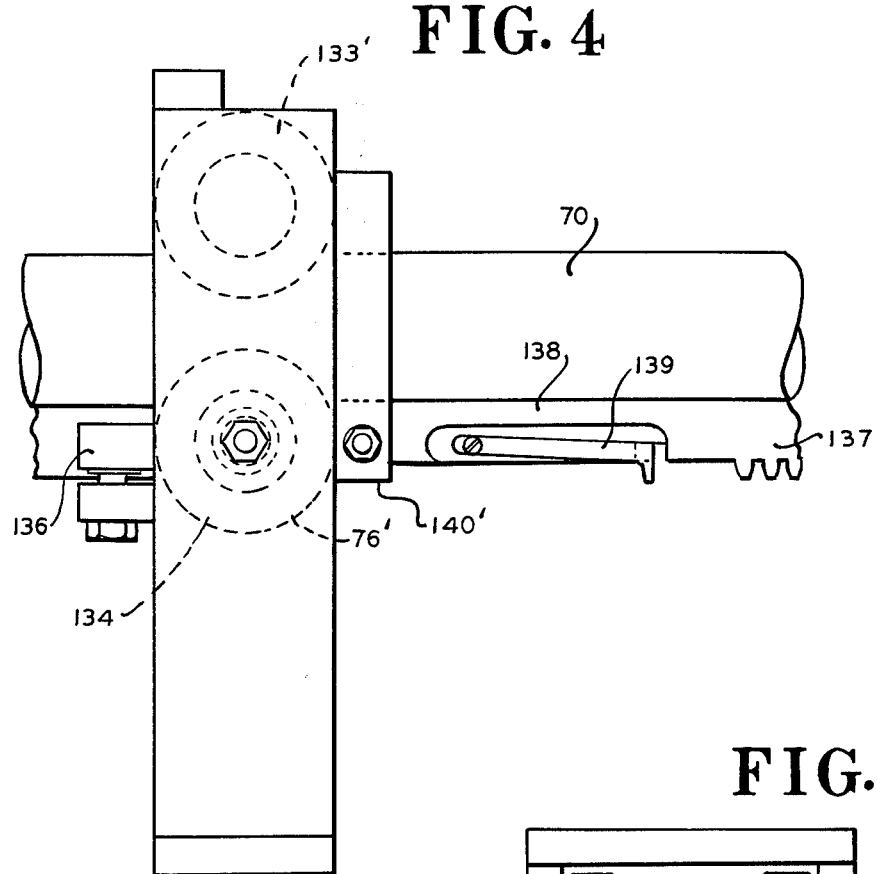
FIG. 4 is a side elevational fragmentary view of a portion of a movable fluid inlet member pursuant to the invention.
Figure 5:
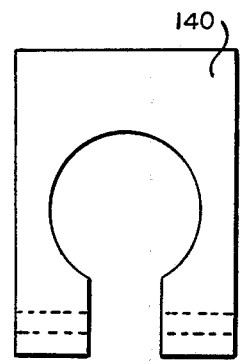
FIG. 5 is an end elevational view of a top place in accordance with the invention.
Figure 6:
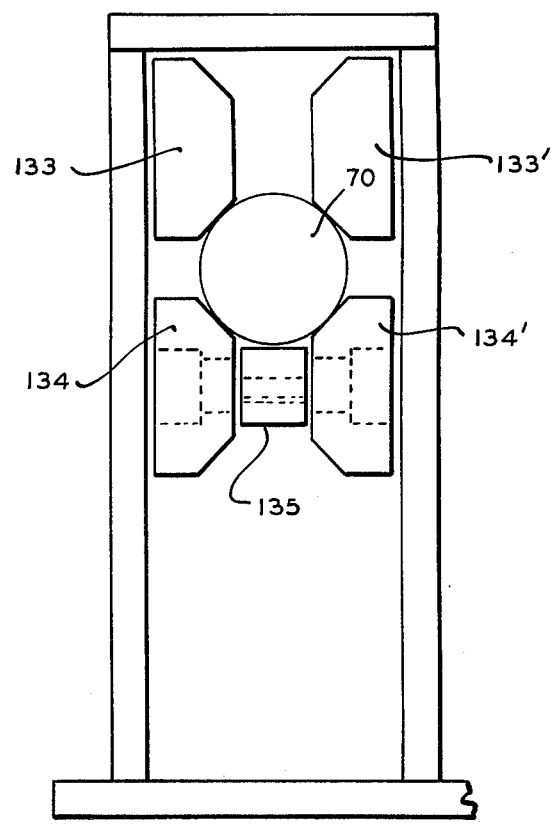
FIG. 6 is an end elevational fragmentary view of a bracket support plate taken at line 6—6 in FIG. 4.

The movable fluid inlet member 14, as shown in FIGS. 1–3, for example, comprises an upper tubular portion 70, a lower tubular portion 71, which is movable into and out of the housing 11, and which includes a perforated section 72 having an inlet-side end portion 73 and a discharge-side end portion 74, and an end plate 75 at one end thereof, and a U-shaped tubular connector section 76 which is connected at one end thereof to the upper tubular portion 70 and at the other end thereof to the lower tubular portion 71. An inlet valve 77 and an air valve (not shown) are connected at first ends thereof to the upper tubular portion 70, and an inlet gauge 78 is connected to the inlet valve 77. A flexible inlet tube 79 is connected at one end thereof to the second end of the inlet valve 77, and a pump 88 is connected to the other end of the flexible inlet tube 79. A motor 81 is connected to the pump 80.

The means 15 for sealing the filter medium in the filter chamber, as shown for example in FIG. 1, comprise an inlet-side bearing surface 90 at the perforated section inlet-side end portion 73 of the movable fluid inlet member lower tubular portion 70, a discharge-side bearing surface 91 at the perforated section discharge-side end portion 74 of the movable fluid inlet member lower tubular portion 70, an inlet-side flexible sealing member 92 and a discharge-side flexible sealing members 93, which are generally comformable to the shape of the bearing surfaces 90, 91, and means 94 for pressurizing the flexible sealing members 92 and 93. The bearing surfaces 90 and 91 may comprise, for example sealing mandrel sections of the movable fluid inlet member lower tubular portion 70. The flexible sealing members 92 and 93 may comprise, for example, elastomeric elements which seal about the ends and along the medial portions thereof against the bearing surfaces 90 and 91. The inlet-side flexible sealing member 92 is mounted in the inlet-side sealing chamber 13 by an inlet-side inner sleeve 95 and an inlet-side outer sleeve 96 which are mounted to the inside surface 31 of the tubular inlet-side frame segment 29, by an inlet-side inner clamp plate 97 which includes a clamp portion 98 and bolt connectors 99, 99' which connect the clamp portion 98 to the inlet-side annular plate second side wall 36, and by an inlet-side outer clamp plate 100 which includes a clamp portion 101 and bolt connectors 102, 102' which connect the clamp portion 101 to the inlet-side end ring first side wall 42. The discharge-side flexible sealing member 93 is mounted in the discharge-side sealing chamber 13', by a discharge-side inner sleeve 103 and a discharge-side outer sleeve 104 which are mounted to the inside surface 48 of the tubular discharge-side frame segment 46, by discharge-side inner clamp plate 105 which includes a clamp portion 106 and bolt connectors 107, 107' which connect the clamp portion 106 to the inlet-side annular plate second side wall 36, and by a discharge-side outer clamp plate 108 which includes a clamp portion 109 and bolt connectors 110, 110', which connect the clamp portion 109 to the discharge-side end ring first side wall 59. The pressurizing means 94 may comprise a hydraulic or pneumatic pressure source (not shown), which is connected to a first end of a pressure line 111 which is connected at second ends thereof through inlet openings 112, 112' to the sealing chambers 13, 13'. A valve 113 is connected to the pressure line 111, and a gauge 114 is connected to the valve 113.

The movable length of filter medium 16, for example, as illustrated in FIGS. 1 and 2, includes a slit portion 120 at one end thereof, a filtering portion 121 in the central section thereof, and a supply portion 122 at the other end thereof. Slitting wheels 123, 123', which are mounted to the housing 11 in the path of displacement of the filtering portion 121, slit the filter medium to form the slit portion 120 which is then collected in the discard container 124. The supply portion 122 is supported on a support shaft 125 which is mounted by support brackets (126 shown, another support bracket not shown) to the base 23. A filter medium guide bar 127, over which the supply portion 120 passes, is mounted to a guide support 128 which is mounted to the inlet-side end ring second side wall 43 of the housing 11.

The means 17 for displacing the movable length of filter medium 16 and the movable fluid inlet member 14, as illustrated in FIGS. 1–3, for example, include guiding means 130, which guide the movement of the movable fluid inlet member upper tubular portion 70, which include a support plate 131 which is mounted to the housing 11 top surface, bracket support plates 132, 132' which are mounted to the support plate 131 at spaced apart locations thereon, and rollers 133, 133' and 134, 134' which are mounted in the bracket support plates 132, 132' to bear against the movable fluid inlet member upper tubular portion 70. A guide rail 135 is mounted along a portion of the bottom surface of the movable fluid inlet member upper tubular portion 70. Roller guides 136, 136' are mounted to the bracket support plates 132, 132' to bear against the guide rail 135. A rack 137 is mounted along a portion of the bottom surface of the movable fluid inlet member upper tubular portion 70, and includes a blank section 138 therein, and a pawl 139 is mounted to the bottom surface of the movable fluid inlet member upper tubular portion 70. Stop plates 140, 140' 140" are mounted to the movable fluid inlet member upper tubular portion 70 at spaced apart locations thereon. A gear train, (not shown), which is mounted in a gear box 141, includes guide wheel gears (not shown) mounted to the guide wheel shafts (142 shown, another guide wheel shaft not shown) a pinion gear (not shown), mounted to a pinion shaft 143, which is engageable with the rack 137 and the pawl 139, and connecting gears (not shown) which connect the pinion gear and the guide wheel gears. Guide wheels (144 shown, another guide wheel not shown) are mounted to the guide wheel shafts 142, and include radial openings 145, reciprocating filter medium engaging members 146, which may comprise, for example, radially extendable spikes, which are located in the guide wheels 144 and which are extendable through the radial openings 145, and means (not shown) for reciprocating the extendable spikes 146, such as an international cam arrangement. Means 147 for driving the gear train include a drive wheel 148, which is mounted to the end of the pinion shaft 143, and which may be automatically or manually operable. The filtrate outlet 18, as shown for example, in FIGS. 1 and 2, comprises a flange 150 which is mounted to the housing 11 and connected to the filter chamber 12 about a filtrate opening.

In the operation of the percent device, for example, in order to prepare the fluid filtering apparatus 10 for a filtration cycle, a new length of filter medium is indexed in the filter chamber 12 by de-pressurizing the flexible sealing members 92 and 93 in the sealing chambers 13, 13', and rotating the drive wheel 148 in a clockwise direction, which generates clockwise rotation of the pinion shaft 143, and corresponding rotation of the pinion gear, the connecting gears, and the guide wheel gears (not shown), and the guide wheel shafts 142. The pinion gear engages the rack 137 and generates transverse outward movement of the movable fluid inlet member 14 including the discharge-side bearing surface 91 from the housing 11. Movement of the movable fluid inlet member 14 is guided by the rollers 133, 133' and 134, 134' which bear against the upper tubular portion 70, and by the roller guides 136, 136' which bear against the guide rail 135. Concurrently, rotation of the guide wheel gear generates rotation of the guide wheels 144 and the reciprocating spikes 146 which engage the movable length of the filter medium 16 and extract the used filtering portion 121 of filter medium from the filter chamber 12. The reciprocating spikes 146 in the guide wheel 144 engages the free end of the filter medium by extending through the radial openings 145 and sequentially indexing the filter medium for a distance equivalent to the length of arc over which the spike is extended by an internal cam arrangement (not shown); the spikes 146 then retract through the radial openings 145, which serve to remove adhering substances therefrom, and release the filter medium at the point where the spike is released by the internal cam arrangement. Movement of the lower tubular portion 71 generates rotation of the slitting wheels 123, 123' which slit the used filtering portion 121 of filter medium which is being displaced, whereupon the slit filtering portion with discard particles embedded therein and collected discard particles associated therewith, is collected in the discard container 124. The indexing operation continues until the pinion gear engages the rack blank section 138, and the stop plates 140, 140' contact the roller guides 136, 136' as shown in FIG. 3. Upon further rotation of the drive wheel 148, the pinion gear rotates and is engaged by the pawl 139 which rides in the pinion gear teeth, thereby preventing further movement of the fluid inlet member 14, while the gear train rotates and generates rotation of the guide wheel gear, the guide wheel shaft 142 and the guide wheel 144, whereby the reciprocating spikes 146 continue to engage and extract the filter medium while the discharge-side bearing surface 91 remains in position outside the housing 11 and spaced from the slit portion 120 of the filter medium, with the discard particles embedded therein and collected thereby, which falls into the discard container 124, to thereby complete indexing of a new length of filter medium and displacement of the used length of filter medium. To return the movable fluid inlet member lower tubular portion 71 to position in the housing 11 in preparation for the next filtration cycle, the drive wheel 148 is rotated in a counterclockwise direction, which generates counterclockwise rotation of the pinion gear (not shown), while the guide wheel gears, and the guide wheels 144 which rotate only in one direction as required for extraction of the filter medium, remain stationary. The pinion gear engages the rack 137 and generates transverse inward movement of the movable fluid inlet member 14 including the discharge-side bearing surface 91 into the housing 11. The return operation continues until the stop plates 140', 140'' contact the bracket support plates 132, 132' as shown in FIG. 2.

During the filtration cycle, the flexible sealing members 92 and 93 are pressurized by the pressurizing means 94 to seal about the ends and along the medial portions thereof against the bearing surfaces 90 and 91 in order to seal the filter chamber 12, and fluid is pumped through the flexible inlet tube 79, the movable fluid inlet member 14 including the lower tubular portion perforated section 72, and the filtration section 121 of the filter medium. The filtrate then passes through thefiltrate opening and the flange 150. Some discard particles become embedded in the filtration section 121 of the filter medium, while other discard particles become associated with and are collected by the embedded discard particles. Filtration continues until there is a high back pressure reading indicated on the inlet guage 78, whereupon a cleaning cycle is initiated.

During the cleaning cycle, the inlet valve 78 is closed and the air valve (not shown) is opened, enabling air under pressure to flow through the movable fluid inlet member 14, the filter chamber 12, and the filtrate outlet 18, which forces all solution in the filter chamber 12 out the filtrate outlet 18. Afterwards, a new length of filter medium is indexed and the used length of filter medium is displaced, as set forth above.

In accordance with the foregoing description, it can be seen that the synchronized simultaneous displacement of the discharge-side bearing surface 91 and the movable length of filter media 16 including the used length of filter medium (which comprises the filtration section 121) with solid discard particles associated therewith which are embedded therein and collected thereby, enables efficient displacement of the used length of filter medium from the filter chamber and indexing of a new length of filter medium in the filter chamber without interference from or with the discharge-side sealing means 15. Since the discharge-side bearing surface 91 is displaced to a position wherein the used length of filter medium 121 with discard particles associated therewith may pass clear thereof, and the movable length of filter medium 16 including the used length 121 thereof is displaced clear of the discharge-side movable bearing surface 91, operational restrictions otherwise required to compensate for accumulations of discard particles are substantially eliminated, which enables high volume filtration operations, over a wide range of fluid inlet pressures, for long periods of time, to enable filtration of discard particles in a wide range of shapes and sizes. Furthermore, the flexible sealing members 92, 93, which seal about the ends, providing small end portions adjacent the filter chamber 12 on which the internal fluid acts, and which conform to the shape of the bearing surfaces 90, 91, along the medial portions thereof to seal the filter chamber 12, to provide a minimal area exposed to the fluid pressure for efficient sealing which is capable of withstanding high internal fluid pressures. Still further, the reciprocating spikes 145 in the guide wheels 144, which are extended for short arc distances and retract through openings which serve to remove substances therefrom, provide effective filter medium displacement while preventing adherence of interfering substances thereto.

While the present invention has been particularly set forth in terms of a specific embodiment thereof, it will be understood in view of the instant disclosure that numerous variations upon the invention are now enabled to those skilled in the art, in which variations in propriety are within the scope of the instant teaching. Accordingly, the invention is to be broadly construed and limited only by the scope and spirit of the claims now appended thereto.

We claim:

1. An apparatus for filtering fluids, which comprises:
   a. a housing, comprising
      1. a filter chamber including a first end wall having an opening, a second end wall having an opening, and a first enclosing side wall having a filtrate opening;
      2. a first sealing chamber including the first end wall, a third end wall having an opening, and a second enclosing side wall; and
      3. a second sealing chamber including the second end wall, a fourth end wall having an opening, and a third enclosing side wall;
   b. a tubular fluid inlet member slidably movable through the openings in the end walls in the housing, which includes at a first end a first section, a second section, and a perforated medial section which is located intermediate the first section and second section;
   c. tubular filter media extendable through the openings in the end walls in the housing;
   d. means for displacing the tubular fluid inlet member and the tubular filter media so that during filtration the first end of the tubular fluid inlet member extends into the housing through the tubular filter media for positioning the first section in the first sealing chamber, the medial section in the filter chamber, and the second section in the second sealing chamber, and after filtration the length of tubular filter media in which the filtered solids are retained and the second section and medial section of the tubular fluid inlet member are displaced from the housing; and
   e. means for sealing the filter chamber which cooperate with the first section and second section of the tubular fluid inlet member to seal the filter chamber.

2. A fluid filtering apparatus as recited in claim 1, in which the first section of the tubular fluid inlet member comprises a first mandrel, the second section of the tubular fluid inlet member comprises a second mandrel, and the sealing means comprise a first tubular flexible seal mounted in the first sealing chamber, a second tubular flexible seal mounted in the second sealing chamber, and means for expanding the first tubular flexible seal and the second tubular flexible seal so that during filtration the first tubular flexible seal is expanded about the first mandrel and the second tubular flexible seal is expanded about the second mandrel.

3. A fluid filtering apparatus as recited in claim 1, in which the tubular fluid inlet member includes, at the second end, a guide rail, a rack having a blank section, and a pawl pivotally mounted in the blank section of the rack, and in which the displacing means includes a second housing, a first shaft rotatably journalled in the second housing, a pinion gear mounted on the first shaft engageable with the rack or pawl, a second shaft rotatably journalled in the second housing, a guide wheel engageable with the tubular filter media mounted on the second shaft, a guide wheel gear mounted on the second shaft, and a gear train mounted in the second housing engaged with the pinion gear at one end and the guide wheel gear at the other end.

4. A fluid filtering apparatus as recited in claim 2, in which the first tubular flexible seal and second tubular flexible seal are expandable to seal about the ends and along the medial portion of the first mandrel and the second mandrel respectively.

5. A fluid filtering apparatus as recited in claim 3, in which the guide wheel has openings at circumferential locations, and includes a plurality of fingers radially extendable, and means for reciprocally extending and retracting the fingers radially through the circumferential wheel openings to engage and release the tubular filter media.

6. A fluid filtering apparatus as recited in claim 3, further comprising means for supporting the other end of the tubular fluid inlet member, comprising a bracket support plate including first rollers mounted therein which bear against the tubular fluid inlet member, and second rollers mounted therein which bear against the guide rail.

7. A fluid filtering apparatus as recited in claim 3, further comprising slitting wheels mounted at one end of the housing in the path of displacement of the tubular filter media.

* * * * *